United States Patent
Haegele et al.

(10) Patent No.: US 9,731,753 B2
(45) Date of Patent: Aug. 15, 2017

(54) POWER STEERING COMPONENT FOR MOTOR VEHICLES WITH REVERSIBLE PUMP

(71) Applicant: ZF LENKSYSTEME GMBH, Schwäbisch Gmünd (DE)

(72) Inventors: Michael Haegele, Aalen (DE); Helmut Bareis, Eschach (DE); Daniel Forster, Aalen (DE)

(73) Assignee: ROBERT BOSCH AUTOMOTIVE STEERING GMBH, Schwaebisch Gmuend (DE)

( * ) Notice: Subject to any disclaimer, the term of this patent is extended or adjusted under 35 U.S.C. 154(b) by 244 days.

(21) Appl. No.: 14/442,929

(22) PCT Filed: Oct. 22, 2013

(86) PCT No.: PCT/EP2013/072045
§ 371 (c)(1),
(2) Date: May 14, 2015

(87) PCT Pub. No.: WO2014/079635
PCT Pub. Date: May 30, 2014

(65) Prior Publication Data
US 2015/0291209 A1    Oct. 15, 2015

(30) Foreign Application Priority Data
Nov. 21, 2012 (DE) .......................... 10 2012 111 211

(51) Int. Cl.
*B62D 5/065* (2006.01)
*B62D 5/24* (2006.01)
(Continued)

(52) U.S. Cl.
CPC .............. *B62D 5/065* (2013.01); *B62D 5/20* (2013.01); *B62D 5/24* (2013.01); *B62D 6/10* (2013.01)

(58) Field of Classification Search
CPC . B62D 5/065; B62D 5/20; B62D 5/24; B62D 6/10
See application file for complete search history.

(56) References Cited

U.S. PATENT DOCUMENTS 3,908,779 A * 9/1975 Inoue ....................... B62D 6/02
180/422
4,028,996 A * 6/1977 Jablonsky .............. B62D 5/061
91/401
(Continued)

FOREIGN PATENT DOCUMENTS

| DE | 10 2007 002 542 | 9/2007 |
| EP | 1 905 672 | 4/2008 |
| JP | 2005-306317 | 11/2005 |

*Primary Examiner* — Anne Marie Boehler
*Assistant Examiner* — Michael Stabley
(74) *Attorney, Agent, or Firm* — Jordan and Koda, PLLC

(57) ABSTRACT

A steering gear component for a vehicle, comprising: a worm, which is mounted so as to be rotatably and axially non-displace able, wherein the worm has a ball screw for receiving a row of balls, and a ball nut, which is drivingly connected to the worm by way of the row of balls, and wherein the ball nut acts as a piston of a cylinder for steering force assistance, wherein a signal transmitter for a sensing element is arranged on the steering spindle and the sensing element is arranged on the worm, or wherein the sensing element is arranged on the steering spindle and the signal transmitter for the sensing element is arranged on the worm.

7 Claims, 4 Drawing Sheets

(51) Int. Cl.
 *B62D 5/20* (2006.01)
 *B62D 6/10* (2006.01)

(56) References Cited

U.S. PATENT DOCUMENTS

| | | | | |
|---|---|---|---|---|
| 4,261,248 A * | 4/1981 | Elser | ...................... | B62D 5/061 |
| | | | | 74/499 |
| 4,417,501 A * | 11/1983 | Elser | ...................... | B62D 5/083 |
| | | | | 180/427 |
| 4,421,010 A * | 12/1983 | Elser | ........................ | B62D 5/24 |
| | | | | 180/427 |
| 5,080,186 A * | 1/1992 | Elser | .................... | B62D 5/0421 |
| | | | | 180/407 |
| 5,205,372 A * | 4/1993 | Kotake | .................. | B62D 5/061 |
| | | | | 180/441 |
| 5,299,649 A * | 4/1994 | Sano | .................... | B62D 5/0448 |
| | | | | 180/400 |
| 5,361,861 A * | 11/1994 | Miller | .................... | B62D 5/083 |
| | | | | 180/441 |
| 5,442,956 A * | 8/1995 | Persson | ................ | G01D 5/2073 |
| | | | | 73/117.02 |
| 6,272,947 B1 * | 8/2001 | Howard | .................... | B62D 6/04 |
| | | | | 280/90 |
| 7,114,429 B1 * | 10/2006 | Roethlisberger | ........ | F15B 15/06 |
| | | | | 91/375 R |
| 7,364,005 B2 * | 4/2008 | Budaker | .................. | B62D 1/16 |
| | | | | 180/428 |
| 7,648,003 B2 * | 1/2010 | Miyajima | .............. | B62D 5/065 |
| | | | | 180/421 |
| 8,955,640 B2 * | 2/2015 | Ishikawa | ................ | B62D 5/061 |
| | | | | 180/428 |
| 2008/0078263 A1 * | 4/2008 | Pattok | .................. | B62D 5/0403 |
| | | | | 74/388 PS |

* cited by examiner

POWER STEERING COMPONENT FOR MOTOR VEHICLES WITH REVERSIBLE PUMP

FIELD OF THE INVENTION

The present invention relates to a steering gear for a vehicle and to a steering system.

BACKGROUND OF THE INVENTION

Power steering systems for vehicles comprising a ball nut, the lateral walls of which are used as movable limits of cylinder spaces/pressure chambers/cylinder chambers, are known from the prior art. Introducing pressure media into these cylinder chambers allows a movement of the ball nut to be facilitated, thereby producing power steering assistance for the vehicle steering system.

SUMMARY OF THE INVENTION

In the case of a steering gear with steering force assistance, the pressure medium, in particular oil, is produced by way of a pump and adequately distributed into two cylinder chambers/pressure chambers by a rotary slide valve. Because of the rotary slide valve, an extensive duct system is necessary. Each of the individual ducts of this system must be sealed. As a result, a large amount of space is required.

One object is thus to provide a steering gear with a steering force assistance which allows for a compact design.

As a first embodiment of the invention, a steering gear for a vehicle is provided, comprising: a worm, which is mounted so as to be rotatably and axially non-displaceable, wherein the worm has a ball screw for receiving a row of balls, and a ball nut, which is drivingly connected to the worm by way of the row of balls, wherein the ball nut acts as a piston of a cylinder for steering force assistance, wherein a signal transmitter for a sensing element is arranged on the steering spindle and the sensing element is arranged on the worm, or wherein the sensing element is arranged on the steering spindle and the signal transmitter for the sensing element is arranged on the worm.

Arranging the signal transmitter and sensing element on the worm or on the steering spindle allows for a compact design of the steering gear.

As a second embodiment of the invention, a steering system is provided, which comprises a steering gear according to one of claims 1 through 7, wherein the steering system has an electric motor for driving a pump to generate pressure in a pressure medium, in particular oil, to provide steering force assistance.

Exemplary embodiments are described in the dependent claims.

According to an exemplary embodiment of the invention, a steering gear is provided, wherein the signal transmitter is a magnetic ring and the sensing element is a torque sensor.

Through the use of a torque sensor, it can be ensured that the steering gear is acted upon by an auxiliary force more rapidly.

In another embodiment according to the invention, a steering gear is provided, wherein a torsion bar ensures a connection between the worm and steering spindle, and wherein a metal tube is pressed into the worm, a bearing being arranged between the metal tube and the steering spindle.

According to another exemplary embodiment of the present invention, a steering gear is provided, wherein the bearing is realized through one, two, three, four, five, six or any desired number of needle bearings.

This arrangement of a metal tube with a bearing having, for example, a needle bearing or ball bearing, allows the signal production to be improved, thereby allowing more accurate torque sensor signals to be obtained.

According to an exemplary embodiment of the invention, a steering gear is provided, wherein the cylinder for steering force assistance is sealed with exactly one level of seals.

The use of a reversible pump allows an extensive duct system for supplying and conducting away pressure medium to be omitted. As a result, a simplified sealing of the pressure chambers of the cylinder for steering force assistance can be achieved with only one level of sealing.

In another embodiment according to the invention, a steering gear is provided, wherein the seal is a high-pressure seal.

The use of a high-pressure seal ensures secure sealing of the pressure chambers of the cylinder for generating the steering force.

According to another exemplary embodiment of the present invention, a steering gear is provided, wherein the high-pressure seal comprises a support ring.

In another embodiment according to the invention a steering system is provided, wherein the pump is a reversible pump, wherein the cylinder comprises a first pressure chamber and a second pressure chamber, and wherein the pump can pump a pressure medium, in particular oil, into the first pressure chamber and/or into the second pressure chamber.

The use of a reversible pump allows a comprehensive duct system for supplying the pressure chambers of the cylinder to be omitted, thereby allowing a compact design to be achieved. A reversible pump can be run in the clockwise or counterclockwise direction. Running this in the counterclockwise direction allows a first pressure chamber to be charged with pressure medium, while running this in the clockwise direction allows a second pressure chamber to be charged with pressure medium. The feed lines of the reversible pump are connected directly to the first and/or second pressure chamber, thereby allowing an extensive and complex line system to be omitted.

According to an exemplary embodiment of the invention, a steering gear is provided, wherein the torque sensor is provided for controlling the electric motor.

An idea of the invention can be considered that of providing a steering gear with a steering force assistance, wherein an electric motor with reversible pump is used instead of a rotary slide valve. As a result, an extensive duct system that is required due to the rotary slide valve can be omitted, which also renders the sealing of this duct system superfluous. This results overall in a compact design for the steering gear.

The individual features can also naturally be combined with one another, whereby in some cases advantageous effects can arise which exceed the sum of individual effects.

Additional details and advantages of the invention will become clear based on the exemplary embodiments shown in the drawings:

DETAILED DESCRIPTION OF THE PREFERRED EMBODIMENTS

Figure 1:
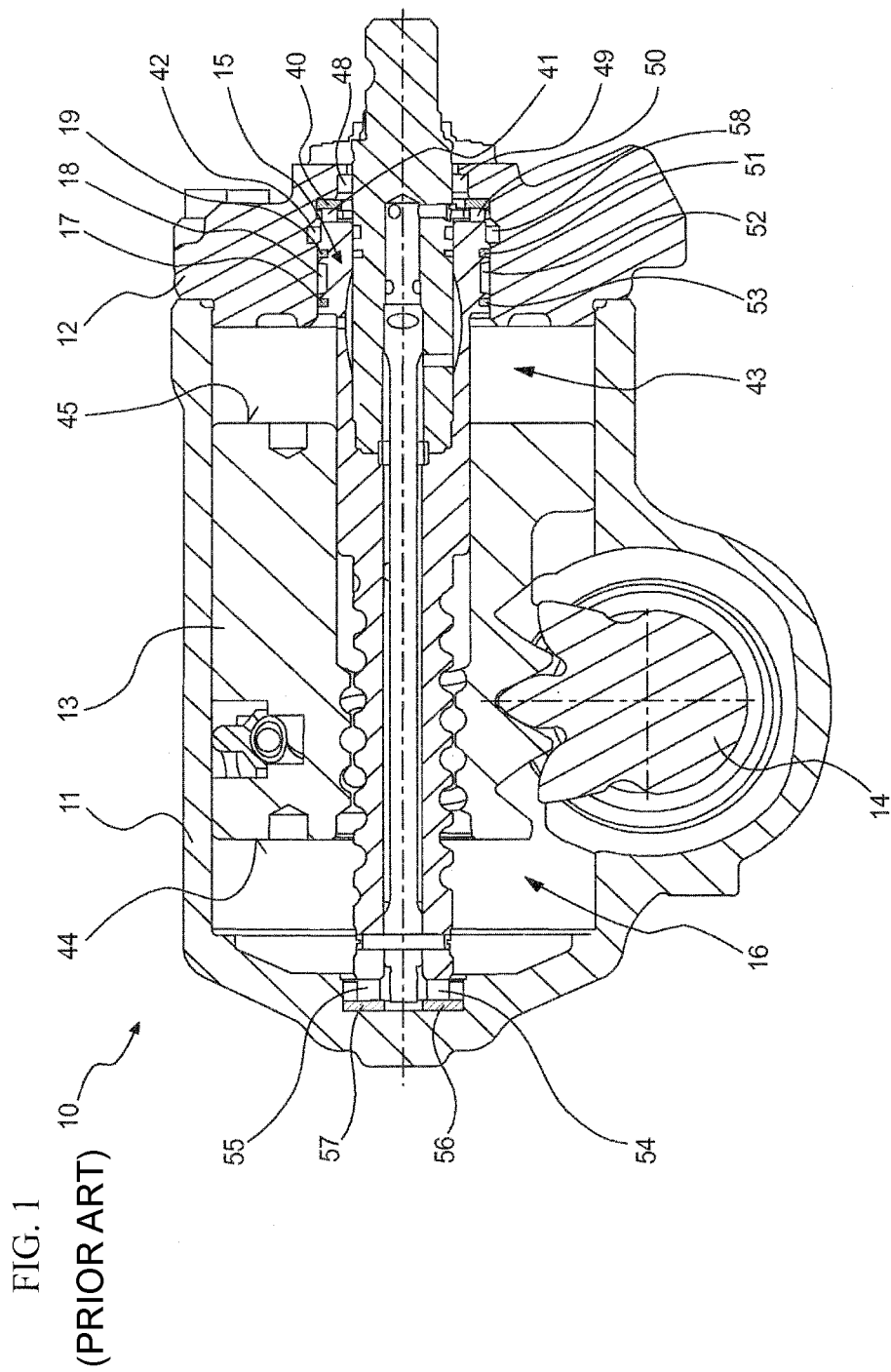
FIG. 1 shows a steering gear of the prior art in a sectional view.

FIG. 1 shows a steering gear 10 of the prior art in a sectional view. The steering gear 10 comprises a rotary slide valve 15. In addition, a ball nut 13 is provided, which is designed as a piston of a cylinder for steering force assistance. The two walls 44, 45 of the ball nut 13 constitute movable limits of the cylinder chambers/pressure chambers 16, 43. The conduction of a pressure medium, in particular oil, into or from the cylinder chambers 16, 43 allows a force to be exerted on the ball nut 13, thereby producing steering force assistance. The cylinder chambers 16, 43 within the housing 11 are sealed with a cover 12. A steering gear 10 of this type is suited particularly for commercial vehicles. The steering gear 10 has steering force assistance with a rotary slide valve 15. The use of the rotary slide valve 15 necessitates ducts 18, 42, 52, 58, each of which must be sealed on all sides. The seal is realized through seals 17, 19, 48, 49, 51, 53 which are arranged in the right area (relative to FIG. 1) of the steering gear 10 as well as within the cover 12. Using the rotary slide valve 15 thus gives rise to a system of ducts 18, 42, 52, 58 for conveying a pressure medium, for example oil, so as to be able to achieve power assistance. This necessitates the cover 12 being of voluminous construction. The disadvantage of using a rotary slide valve 15 for generating power assistance is thus that it results in more space being required for the steering gear 10 due to the numerous ducts 18, 42, 52, 58 and the seals 17, 19, 48, 49, 51, 53 they entail.

Figure 2:
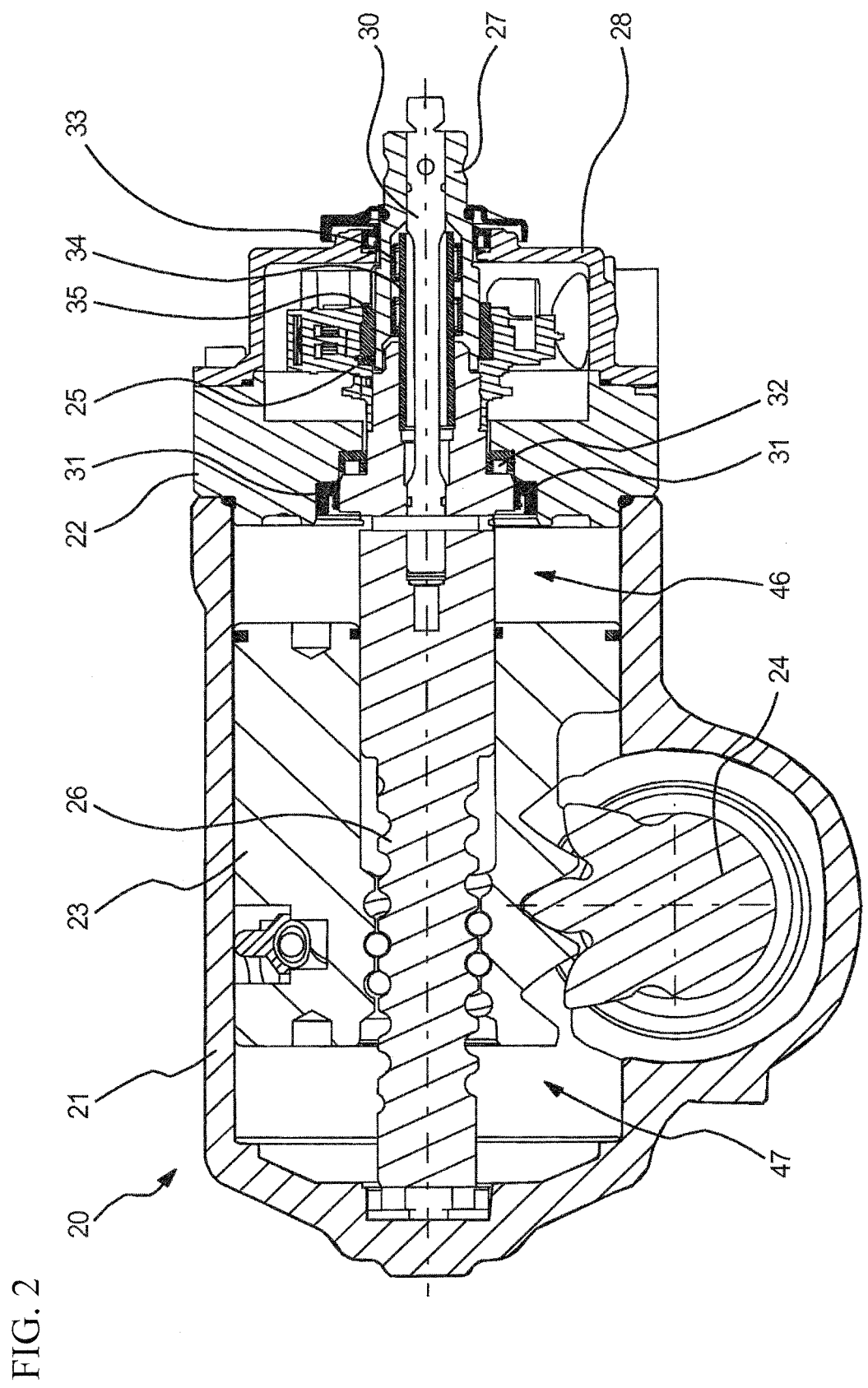
FIG. 2 shows a steering gear according to the invention in a sectional view.

FIG. 2 shows a steering gear 20 according to the invention with a torque sensor 25. The magnetic ring 35 is designed as signal transmitter of the torque sensor 25 and is fastened to the steering spindle 27. The torque sensor 25 is fastened to the worm 26. If the steering spindle 27 rotates relative to the worm 26, this can be detected by the torque sensor 25, and power steering system initiation is triggered. A metal tube 34 is pressed into/inserted into the worm 26, and between the metal tube 34 and steering spindle 27 a bearing is provided, for example through one or multiple needle bearings 33. By way of this arrangement of the metal tube 34 and the bearing, rotation between steering spindle 27 and worm 26 can be detected more precisely, thereby making signal generation more precise. The signals of the torque sensor 25 can be used for controlling an electric motor (not illustrated) so as to be able to generate therewith the necessary, for example hydraulic, pressure for steering force assistance. Notably, a reversible pump is used for generating pressure, which simplifies the construction of the ducts to the cylinder chambers 46, 47. Advantageously, the cylinder chamber 46 can be sealed with only one level of high-pressure seals 31. Because of the simple pressure technology design, additional seals can be omitted. According to the invention, an electric motor can be used for controlling and supplying the reversible pump, so as to pump, for example, oil into the cylinder chambers 46, 47 for steering force assistance.

Thus, in contrast to using a rotary slide valve, only one level of seals, which are designed as high-pressure seals 31, is necessary. Advantageously, the installation space required by the steering gear is thus kept small, thereby resulting in a compact design.

Figure 3:
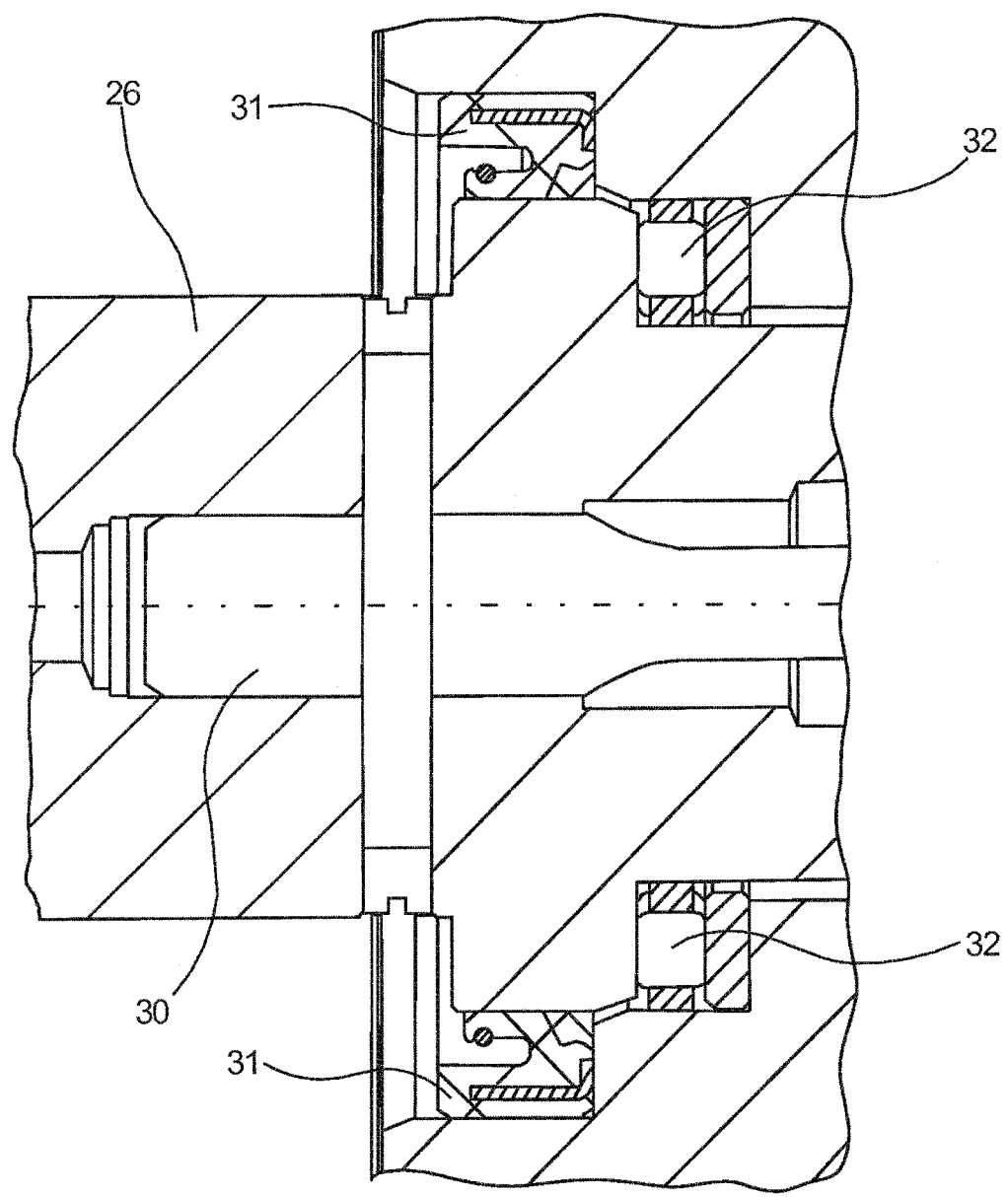
FIG. 3 shows an enlarged detail from the area of the seal in the cover.

FIG. 3 shows an enlarged detail of the steering gear with the torsion bar 30, which ensures a connection between the worm 26 and the steering spindle. The steering gear has only one level of seals comprising the high-pressure seals 31.

Figure 4:
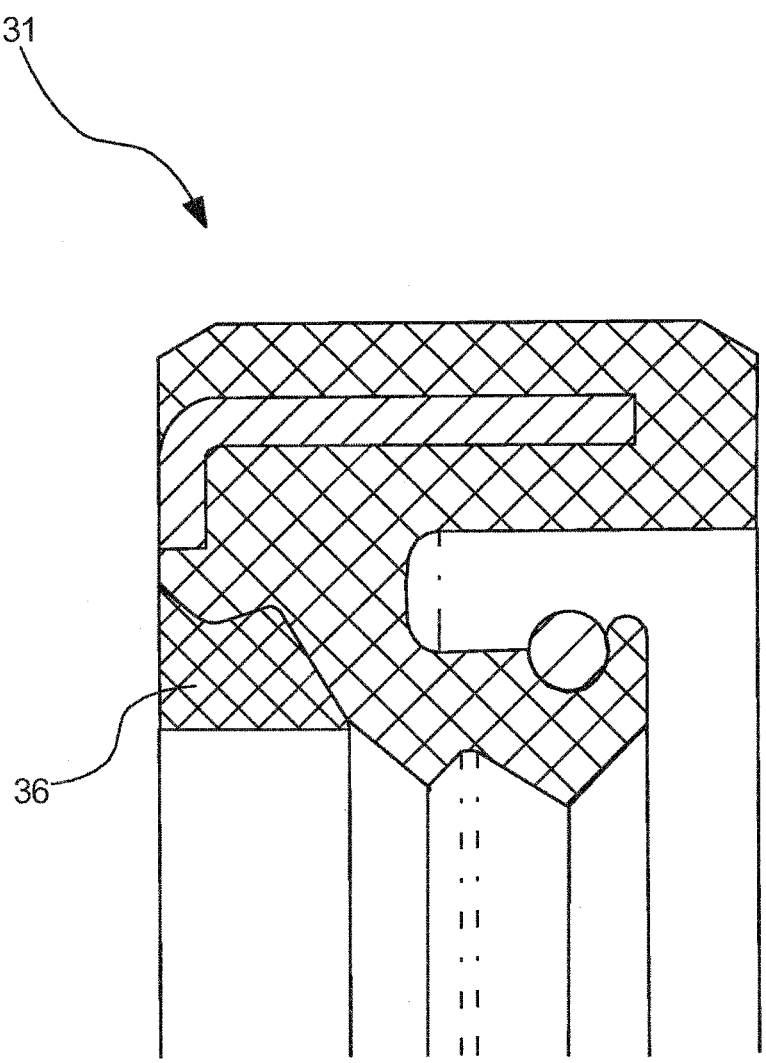
FIG. 4 shows the high-pressure seat in a sectional view.

FIG. 4 shows a high-pressure seal 31 with a support ring 36.

It should be noted that the term "comprise" does not exclude further elements or process steps, just as the term "a" or "an" does not exclude multiple elements and steps.

The reference numbers used serve only to facilitate understanding and should in no way be regarded as limiting, the scope of protection being reflected by the claims.

LIST OF REFERENCE NUMBERS 10 steering gear
11 housing
12 cover
13 ball nut as piston for steering assistance
14 segment shaft
15 rotary slide valve
16 cylinder chamber
17 seal
18 duct
19 seal
20 steering gear
21 housing
22 cover
23 ball nut as piston for steering assistance
24 segment shaft
25 torque sensor
26 worm/ball screw spindle
27 steering spindle
28 sensor cover
29 torsion bar
30 high-pressure seal
31 axial bearing
32 needle bearing
33 tube
34 magnetic ring
36 support ring
40 hardened washer
41 axial bearing
42 duct
43 cylinder chamber
44 wall of a ball nut
45 wall of a ball nut
46 cylinder chamber/pressure chamber
47 cylinder chamber/pressure chamber
48 seal
49 seal
50 axial bearing
51 seal
52 duct
53 seal
54 axial bearing
55 axial bearing
56 hardened washer
57 hardened washer
58 duct

The invention claimed is:

1. A steering gear component comprising:
   a steering gear for a vehicle with a worm which is mounted so as to be rotatably and axially non-displaceable, wherein the worm has a ball screw for receiving a row of balls; and with a ball nut, which is drivingly connected to the worm by way of the row of balls, wherein the hall nut acts as a piston of a cylinder for steering force assistance;

an electric motor for driving a pump for generating a pressure in a pressure medium for steering force assistance, the pump being a reversible pump, wherein the cylinder comprises a first pressure chamber and a second pressure chamber, and wherein the pump can pump a pressure medium into the first pressure chamber and/or into the second pressure chamber, and a signal transmitter for a sensing element is arranged on a steering spindle and the sensing element is arranged on the worm, or wherein the sensing element is arranged on the steering spindle and the signal transmitter for the sensing element is arranged on the worm.

2. The steering gear component according to claim 1, wherein the signal transmitter is a magnetic ring, and the sensing element is a torque sensor.

3. The steering gear component according to claim 1, wherein a torsion bar ensures a connection between the worm and the steering spindle, wherein a metal tube is pressed into the worm, a bearing being arranged between the metal tube and the steering spindle.

4. The steering gear component according to claim 3, wherein the bearing is realized through any of one, two, three, four, five, or six needle bearings.

5. A steering gear component according to claim 1, wherein the cylinder for steering force assistance is sealed with exactly one level of seals.

6. The steering gear component according to claim 5, wherein the seal is a high-pressure seal.

7. The steering gear component according to claim 6, wherein the high-pressure seal comprises a support ring.

* * * * *